United States Patent [19]

Decoene et al.

[11] 4,294,346
[45] Oct. 13, 1981

[54] BALER FEEDER MECHANISM

[75] Inventors: Frans J. G. C. Decoene, Zedelgem; Etienne R. O. C. Hommez, Oostende; Adrianus Naaktgeboren, Zedelgem, all of Belgium

[73] Assignee: Sperry Corporation, New Holland, Pa.

[21] Appl. No.: 77,253

[22] Filed: Sep. 19, 1979

[30] Foreign Application Priority Data

Sep. 30, 1978 [GB] United Kingdom ............... 38836/78

[51] Int. Cl.³ ............................................. B65G 25/02
[52] U.S. Cl. .................................... 198/740; 56/341; 100/189
[58] Field of Search ................. 198/517, 740; 56/341, 56/362; 100/142, 189

[56] References Cited

U.S. PATENT DOCUMENTS

| 1,367,533 | 2/1921 | Brook | 198/740 |
| 2,097,747 | 11/1937 | Suzuki | 198/740 |
| 2,647,355 | 8/1953 | Luke | 198/740 X |
| 2,760,625 | 8/1956 | Lohnert | 198/740 |

Primary Examiner—Jeffrey V. Nase
Attorney, Agent, or Firm—James R. Bell; Frank A. Seemar; Larry W. Miller

[57] ABSTRACT

A bale feed mechanism comprising a feed bar carrying a plurality of tines and drive means for driving the feed bar, the drive means comprising a stationary element and a movable element, the movable element being movable about the center of the stationary element in a first direction of movement and drivingly connected to the stationary element in a manner so that it is caused to move in a second direction of movement about its own center when moved in said first direction, the feed bar being coupled to the movable element at a location offset from the center thereof.

8 Claims, 15 Drawing Figures

BALER FEEDER MECHANISM

BACKGROUND OF THE INVENTION

1. Field of the Invention

The present invention relates generally to agricultural balers and to improved feeder mechanisms of the finger or tine type for such balers.

The conventional automatic baler has a bale case which extends fore-and-aft, that is in a direction parallel to the direction of the movement of the baler. Along one side of the bale case there is a crop inlet and mounted in the bale case is a reciprocable plunger adapted to move past the inlet to compress into bales crop material, such as hay or straw for example, fed into the bale case. Extending laterally from the inlet opening is a feed table or platform onto which hay, straw, or the like is deposited, this crop being lifted from a windrow by a pick-up mechanism. The crop so deposited is conveyed across the feed platform through the inlet opening and into the bale case by feed means. After each bale is formed, it is automatically banded and tied and then discharged onto the ground behind the baler or onto a trailing wagon.

2. Description of the Prior Art

Heretofore, various type of crop feed mechanisms have been applied with various success.

Some balers, such as shown in U.S. Pat. No. 2,450,082, employ a rotating auger to move the crop material from the pick-up mechanism to the bale case. On the other hand, there are a number of balers on the market which accomplish substantially the same result by the use of a multiplicity of pivotable feed fingers having a complex locus achieved by mechanical linkages (see for example, U.S. Pat. No. 2,885,953). Other balers, such as the one disclosed in U.S. Pat. No. 3,115,823 (Canadian Pat. No. 862,066), comprise a track extending transversely to the bale case and above the crop receiving platform. A feed carriage is operable on the track to engage the crop and convey it transversely of the platform and into the bale chamber. The feed carriage has depending feed fingers or tines which stand erect on a feed stroke and lay back on a return stroke. The carriage travels in a rectilinear direction perpendicular to the direction of reciprocation of the plunger. This feed mechanism is very satisfactory for balers with a relatively low capacity.

A high speed feed mechanism is illustrated in U.S. Pat. No. 3,724,363. In this design a feed finger supporting mechanism is secured at one end to a chain which is driven over a pair of sprockets to give said one end of the feed finger supporting mechanism an oval path of motion. The other end of the feed finger supporting mechanism is supported for reciprocal motion in a channel member or assembly by spaced apart roller assemblies. A portion of the channel member is secured to a crank arm which imparts to said portion of the channel member a circular motion. When conveying crop material towards the bale case, the feed fingers move relatively close to the crop receiving platform on which the crop material is deposited from the pick-up. On the return stroke, the tines are relatively more vertically spaced from this platform.

As already stated, all the foregoing feed mechanisms perform generally satisfactory. However, the requirements and demands of farmers and independent operators are increasing with the need for better and more economical baling of crops. Many of the known feeder mechanisms have a rather small capacity which in the present day environment is considered insufficient. This is particularly true for the aforementioned auger type feed mechanism and that comprising a reciprocating feed carriage with depending feed fingers or tines. Also the feed mechanisms with a multiplicity of pivotable feeder tines have a relatively small capacity.

By employing the principle of the chain driven feed mechanism of the type discussed above and disclosed in U.S. Pat. No. 3,724,363, it has been possible materially to increase the speed of a tine or finger type feed mechanism. Such a feed mechanism may operate at up to 100 strokes per minute with an improved entry of the feed tines into the crop on the feed platform and clearance of the crop from that platform.

Nevertheless, some shortcomings have been experienced. It should be noted here that the platform is surrounded by a housing which is open at the front to permit free admission of crop material from the pick-up mechanism. This housing forms a feed chamber. When a baler of this type is operated at or near its capacity, crop material accumulates at the entrance of the feed chamber when the feeder mechanism is on a working stroke and is returning outside the chamber, or at least spaced at a greater distance from the feed platform than on the working stroke, such accumulated material eventually moving into the feed chamber. However, this movement tends to be hesitant because the crop material becomes compacted whilst accumulating, and because of the restricted opening in the front of the feed chamber. The accumulation of material at the feed chamber opening is caused by the uniform or continuous supply of crop material from the pick-up and the non-uniform movement of such material from the feed chamber into the bale case.

To cure this problem, the feed mechanism should be operated at an even greater speed so as to allow less crop material to accumulate at the entrance of the feed chamber during the working and return strokes. However, this is difficult to achieve with known feed mechanisms because an increased operating speed would result in unacceptable vibrations with all the attendant problems. Furthermore, a very aggressive and positive grasp of the feed fingers or tines on the crop material is required during the entire working stroke and over the greatest possible width in the feeder chamber. Many of the known feed mechanisms fail to accomplish this as the tines only fully penetrate the crop material at a substantial distance inwardly of the end of the feed chamber remote from the bale case and as the tines retract prematurely during the working stroke. On the other hand, the feed tines should be fully retracted from the feed chamber during the return stroke so as not to interfere with the entrance of new crop in the feed chamber. This is also not always accomplished and in an attempt to solve this problem, feed tines have been pivotally mounted on the tine carrying member in a manner so as to lay back during the return stroke but these tines may cause crop material to move in a direction in the feed chamber opposite to the intended direction. This is particularly so with the feed mechanisms of the type comprising a reciprocating feed carriage as disclosed in the U.S. Pat. No. 3,115,823 (Can. Pat. No. 862,066).

Furthermore, all the crop material which has entered the feed chamber should be delivered to the bale case as soon as possible so as to allow further crop material to enter the feed chamber. Many known feed mechanisms require more than two strokes to accomplish this. This is unacceptable for present day, high capacity balers.

Many known feed mechanisms have a complicated design with many reciprocating and/or oscillating components causing high vibrations and peak loads during operation. These vibrations and peak load either become harmful and unacceptable, or substantially limit the operating speed. High vibrations caused by the feed mechanism may hamper the operation of other components of the baler. Also, these vibrations and peak loads often result in premature wear, especially when chain transmissions are used in the feed mechanism.

Also certain feed mechanisms have an excessive height which necessarily increases the overall height of the machine. A low profile machine is preferred for several reasons, the major reason being that of permitting the operator to view the discharge end of the bale case from the tractor seat.

Bale shape is another problem which is very much related to the feed mechanism. Bales of even density and of regular rectangular shape are most important for the further mechanical handling of the bale. Furthermore, disformed bales and bales of irregular shape and density in general tend to disintegrate during further handling. It has been found that with certain feed mechanisms the bale shape and density produced is inconsistent due to variations in the type of crop, the moisture content, and size, for example.

Pool bale shape is also obtained with feed mechanisms which do not deliver the crop material far enough into the bale case. In balers having such feed mechanisms, large quantities of material are deposited at the transition between the feed chamber and the bale case. When the plunger moves on a working stroke, it travels rearwardly and past the feed opening. A knife carried on the plunger and cooperable with a fixed knife adjacent the rear vertical edge of the feed opening, shears the crop material to form a wad which is rammed rearwardly and compressed. In those situations where much crop material is cut during each working stroke, a so-called "shingling" or "saw-tooth" effect, is obtained. This results in the bale having a very irregular side edge at the side where the successive wads of crop material are cut. This also means that the cutting forces are extremely high and it may happen that a safety device, such as a shear bolt in the drive line, becomes operative.

SUMMARY OF THE INVENTION

According to the invention a baler feed mechanism comprises a feed bar carrying a plurality of tines and drive means for driving the feed bar in an elliptical path, said means including a first shaft having a first crank connected at one end thereof. The first crank rotatably supporting first and second gears. The first gear being a reversing gear intermeshing with a stationary gear and the second gear. A second shaft supports the second gear at one end thereof and a second crank at another end thereof. The second crank is connected to the feed bar.

BRIEF DESCRIPTION OF THE DRAWINGS

Agricultural balers embodying the present invention will now be described in greater detail, by way of example, with reference to the accompanying drawings, in which.

DETAILED DESCRIPTION OF THE PREFERRED EMBODIMENT

In the following description, right-hand and left-hand references are determined by standing at the rear of the baler and facing in the direction of forward travel. Also, in the following description, it is to be understood that such terms as "forward", "rearward", "left", "right", "upwardly" are words of convenience and are not to be construed as limiting terms.

Figure 1:
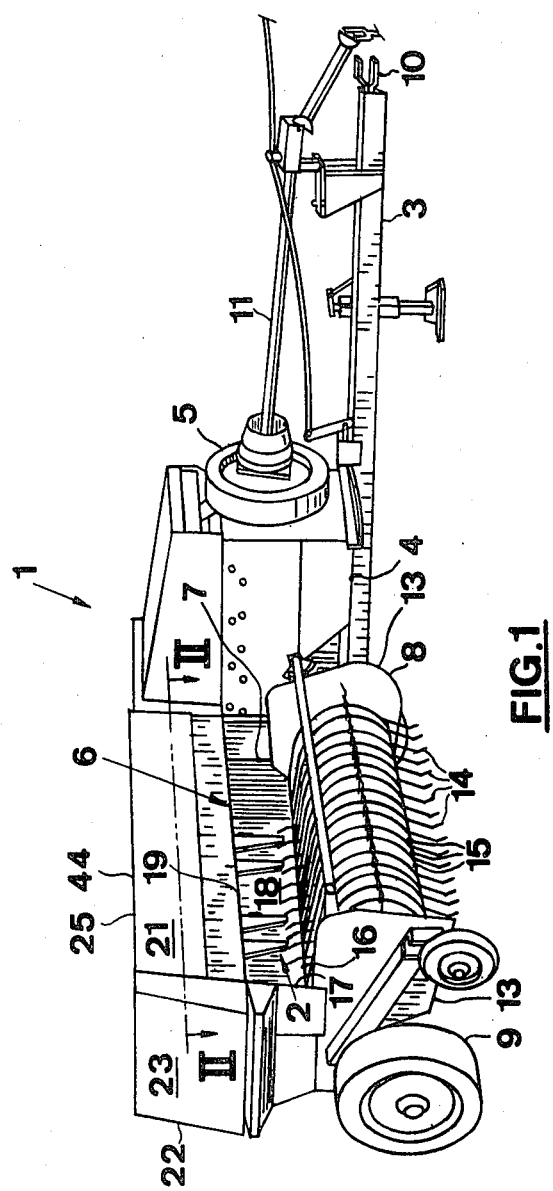
FIG. 1 is a perspective view of one baler.

Referring now to the drawings, and particularly to FIG. 1, there is shown at 1 a baler incorporating a preferred embodiment of the improved baler feed mechanism, designated generally by reference numeral 2, of the present invention. The baler 1 includes a tongue 3 extending forwardly of the baler for attachment to a tractor (not shown), a fore-and-aft extending bale case or chamber 4 having a forward end on which a flywheel 5 is rotatably mounted, a feed housing or chamber 6 extending transversely of the baler and located adjacent the right-hand side of the bale case 4 within which is mounted the feed mechanism 2. The feed mechanism 2 is adapted to convey crop material into the bale case 4 through an inlet opening 7, and a rotatable crop pick-up mechanism 8 mounted on the baler 1 forwardly of and below the feed housing 6 is adapted to lift crop material from the field and deliver it to the feed mechanism 2.

A plunger (not shown) is mounted for reciprocable movement in the bale case 4 for forming the crop material conveyed therein through the inlet opening 7 into rectangular bales. As a bale is formed in the bale case 4, it moves progressively towards the rear of the bale case 4 and when complete, it is banded with a suitable tying medium and subsequently emerges from the rear or discharge end of the bale case 4.

The baler is supported by a pair of ground-engaging wheels 9 and, when articulately connected at a hitch end 10 of its tongue 3 to the drawbar of the tractor, it may be towed across a field. An input driveline, generally designated by reference numeral 11, is connected at its rear end to the baler flywheel 5 and adapted for connection at its forward end to the power-take-off (pto) shaft (not shown) of the tractor for rotation in unison therewith to supply rotary driving power to the operating components of the baler 1 through additional power transmitting components (not shown).

The pick-up mechanism 8 comprises a reel (not shown) rotatable on a shaft the axis of which is transverse to the longitudinal axis of the bale case 4. This shaft is journalled in bearings carried on a pair of spaced side walls 13. The reel has a plurality of outwardly projecting tines 14 which project between a plurality of arcuate stripper plates 15.

Crop material elevated by the tines 14 is moved over the plates 15 and delivered rearwardly to a crop receiving feed platform 16 which extends transversely from the bale case in a horizontal plane contiguous with the lower end of the inlet opening 7.

Disposed around the platform 16 is a housing having a side wall 17, a rear wall 18 and a top wall 19 which is slotted at 20. This housing forms the feed chamber 6 for the reception of the crop material from the pick-up. Mounted on top wall 19 is a housing 44 for the feed mechanism 2, the housing comprising a front wall 21, a rear wall 22, sidewalls 23 and 24, a top wall 25, and an intermediate transverse wall 12.

Affixed to the intermediate wall 12 at transversely spaced apart locations is a pair of bushes 26 which extend through apertures in that wall. The bushes 26 are positioned about half way up the intermediate wall 12 and spaced substantially inwardly of the side walls 23 and 24. The left-hand bush 26 is positioned to the right of the bale case 4. Stationary gears 27 are mounted to the rear of the intermediate wall 12 and extend coaxially with the bushes 26. Bearings 28 in the bushes 26 rotatably support respective shafts 29 which are part of drive means generally indicated at 58. The shafts 29 have keyed thereon at their forward ends respective pinions 30 and, at their rear ends, respective cranks 31.

The pinions 30 are arranged to mesh with respective further pinions 32 on a transverse drive shaft 33 which is rotatably supported in brackets 34 on the front of the wall 12 and which is drivingly coupled to a drive transmission (not shown) to receive rotational drive from the drive line 11.

Each crank 31 rotatably supports a gear train comprising first and second gears 35 and 36, respectively. The first gear 35 is rotatably mounted on a stub shaft 37 fixed to the crank 31 and meshes with the corresponding stationary gear 27. The second gear 36 meshes with the first gear 35 and is keyed on a shaft 38 which itself is rotatably mounted via bearings 39 on the crank 31. The first gear 35 thus acts as a reversing gear between the stationary gear 27 and the second gear 36. The second gear 36 is arranged as close as possible to the stationary gear 27 and the axes of the gears 27, 35 and 36 are positioned at the corners of a triangle. The second gear 36 has exactly half as many teeth as the stationary gear 27.

The shaft 38 supporting the gear 36 at one end is coupled at its other end to one end of a further crank 40, which is arranged to move alongside the first crank 31. The second crank 40 has a length approximately twice that of the first crank 31. Each second crank 40 comprises at its other end a pin 41 and a finger or tine supporting bar 42 is rotatably mounted at its opposite ends on the respective pins 41. Preferably the bar 42 is positioned horizontally, although it could be positioned at a slight incline relative to the horizontal.

Figure 6:
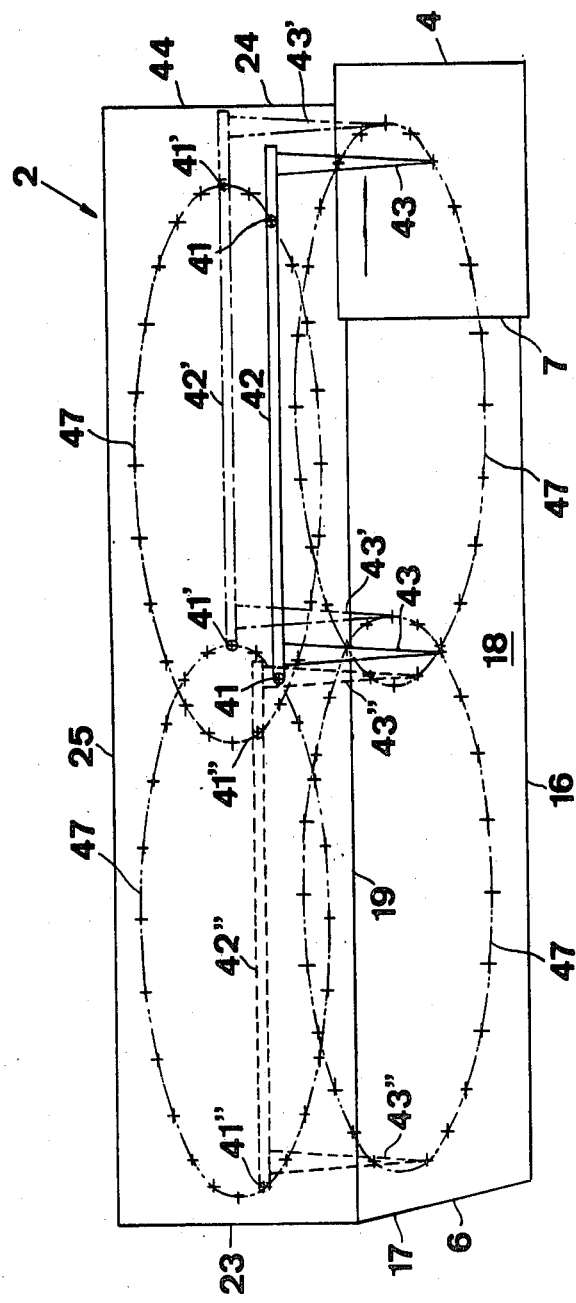
FIG. 6 is a schematic view illustrating the paths of movement of the feed mechanism of the baler during operation.

Feed tines 43 are secured on the tine supporting bar 42 and depend therefrom and extend through the slots 20 in the slotted top wall 19 of the feed chamber 6. Preferably the feed tines 43 are mounted in pairs, one pair adjacent each end of the tine supporting bar 42 and with the tines of each pair positioned one in front of the other. The tine bar 42 is extended beyond the pin 41 adjacent the bale case 4. Both pairs of tines 43 are positioned to the right of the respective pins 41 as is seen in FIG. 6.

The feed tines 43 preferably extend generally perpendicular to the tine supporting bar 42. However, in an alternative arrangement, one pair of tines, or all tines, may be angularly adjustably mounted on the tine supporting bar 42. Also the pairs of tines may be mounted so as to be adjustable along the length of the tine supporting bar.

Preferably the height of the tines 43 generally corresponds to the height of the feed chamber 6, as does that of the feed mechanism housing 44 although the latter may slightly exceed the height of the feed chamber 6.

The corresponding cranks 31 and 40 of both drive means 58 are timed with respect to each other so that at all times during operation they are parallel to each other.

OPERATION OF THE PREFERRED EMBODIMENT

In operation, the baler is towed across a field of cut and windrowed crop material and the various components are driven in a manner which is well known and which therefore will not be described in any further detail. Only the drive and the operation of the feed mechanism 2 will be described in detail hereinafter.

Figure 3:
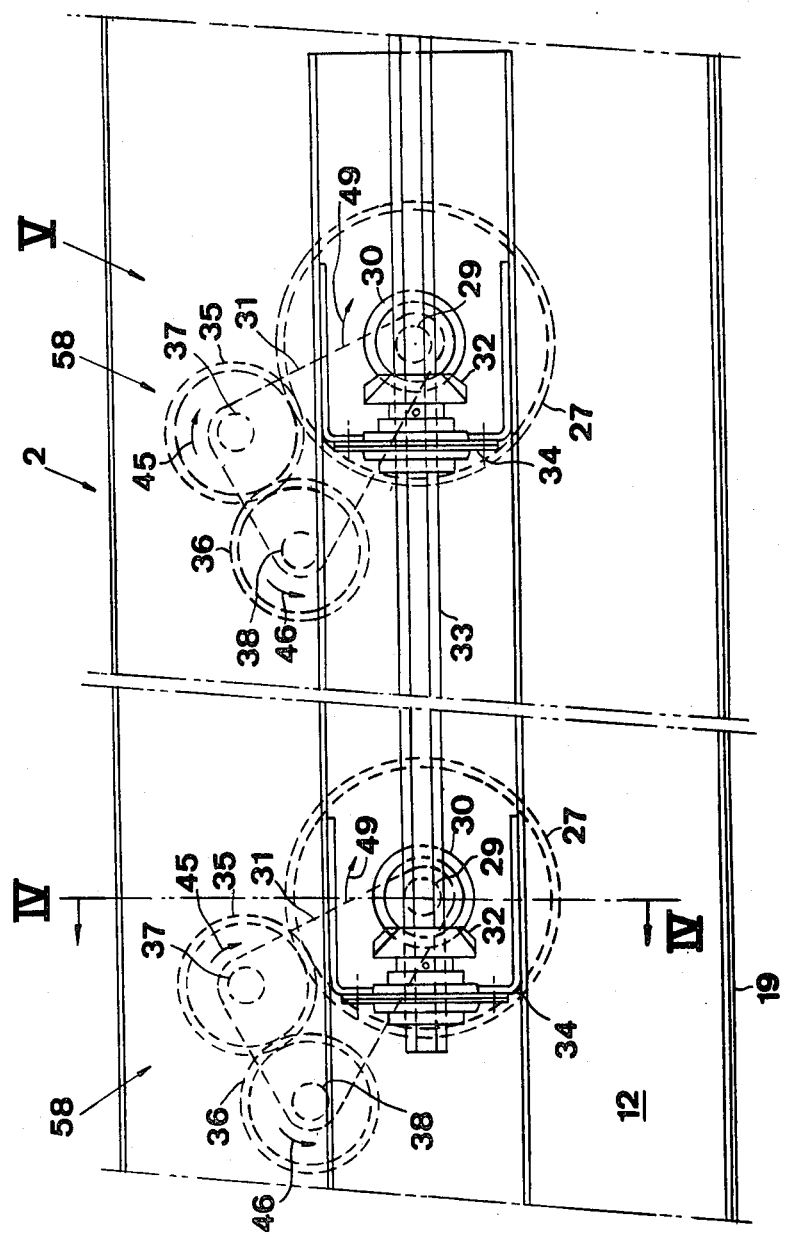
FIG. 3 is a view, with components broken away, on a larger scale taken in the direction of arrow III of FIG. 2.
Figure 5:
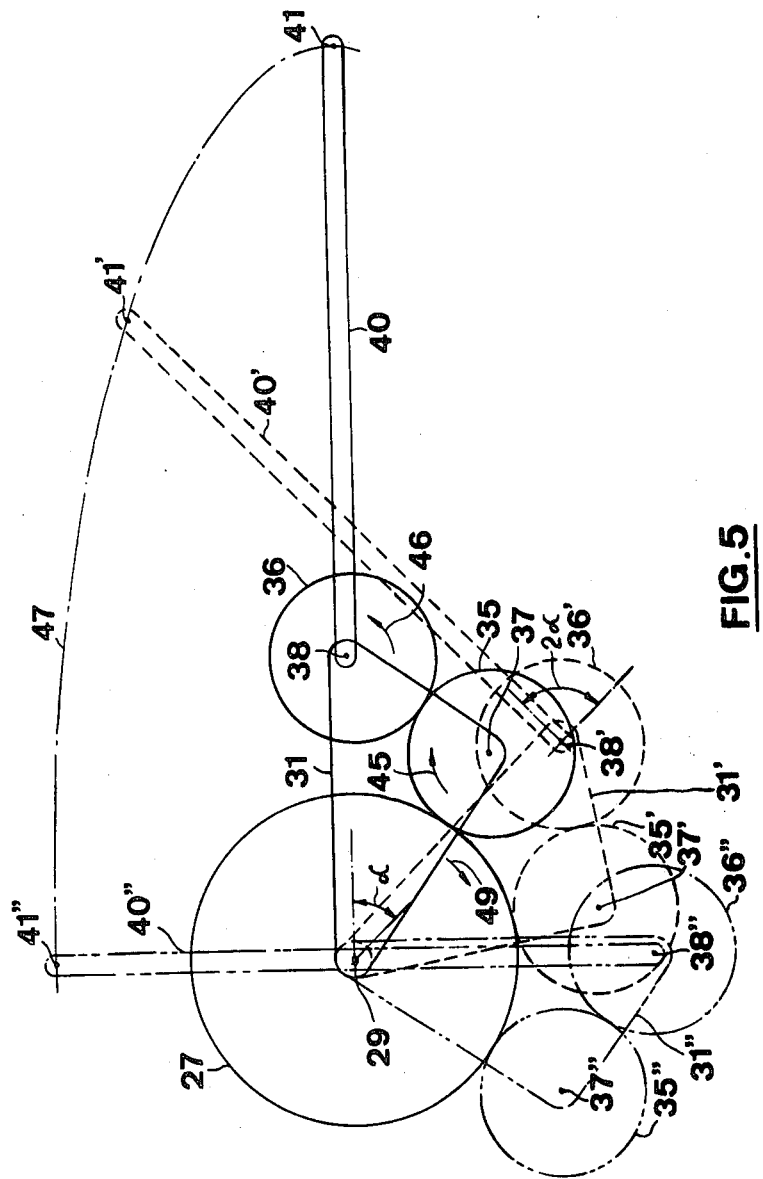
FIG. 5 is a schematic view of the components shown at V in FIG. 3, illustrating these components in three different positions.

The shaft 29 is driven in a direction causing the first cranks 31 to rotate in clockwise direction 49 as is shown in FIGS. 3 and 5. As the gears 27 are mounted stationary on the wall 12, the gears 35 are caused to roll over the stationary gears and thus are rotated in a clockwise direction 45 around the stub shafts 37. This in turn causes the second gears 36 to rotate in an anticlockwise direction 46 around their axes 38 as seen in FIGS. 3 and 5.

FIG. 5 schematically illustrates the principle of operation and the relative motions of the various components such as the first and second gears 35 and 36, the first and second cranks 31 and 40 and a mounting pin 41. A first position of these components is shown in full lines. In this position the shafts 29 and 38 and the pin 41 define a straight line which preferably is generally horizontal. The pin 41 and the shaft 29 are spaced apart in this position over a distance which is the sum of the lengths of the cranks 31 and 40.

A further position is shown in dotted lines. This position is attained by the crank 31 being rotated in the clockwise direction 49 through an angle $\alpha$ around the shaft 29. This causes, as already explained above, the gears 35 and 36 to rotate respectively in the directions 45 and 46 and to be angularly displaced in a clockwise direction around the centre of the stationary gear 27 about the shaft 29. This also causes the pin 41 to move upwardly as seen in FIG. 5 and rotate through an angle of $2\alpha$ around the pivot 38. This relationship between the angular displacements around the shaft 29 and pivot 38 result from the fact that the gear 36 has only half as many teeth as the gear 27. It will be noted that, contrary to all other components, this pin 41 does not describe a circular path but an elliptical path 47.

A third position is shown in chain lines in FIG. 5. In this position the crank 31 has assumed a position 31" at 90° relative to its initial position shown in full lines in FIG. 5. In this position, the crank 31 extends vertically downward from its pivot shaft 29. Also, the gear 36 has described an angular displacement of 90° in the clockwise direction 49 around the shaft 29. Simultaneously, however, the gear 36 has rotated in an opposite direction 46 through 180° around its own axis 38 since it has only half as many teeth as the gear 27. Thus as far as the crank 41 is concerned, the nett movement thereof is 90° in an anticlockwise direction so that it now adopts the position 41" which is vertical as seen in FIG. 5. Thus the cranks 31" and 40" are now oriented in opposite directions, parallel to each other. In this third position, the distance between the shaft 29 and the pin 41 is defined by the difference in the lengths of the cranks 31 and 40. Twice this difference equals the length of the minor axis of the ellipse 47 described by pin 41 and twice the sum of the lengths of the cranks 31 and 40 defines the length of the major axis of the ellipse 47.

The major axis of the or each ellipse 47 is positioned horizontally although this is not an absolute requirement.

It will be appreciated that if the crank 40 were much longer than twice the length of crank 31, this would increase the height of the feed drive mechanism 58 and thus of the feed mechanism housing 44. Ideally, as far as the height of the drive mechanism 58 is concerned, the length of the second crank 40 should not exceed twice the length of the first crank 31 plus the radius of the second gear 36.

The tine supporting bar 42 interconnecting the pins 41 on the spaced apart cranks 40, and thus also the feeder tines 43 mounted on the bar 42, move in elliptical paths transversely of the feeder housing.

In the arrangement where the second crank 40 has a length twice that of the first crank 31, the ellipse 47 described by the mounting pin 41 has a major axis which is three times as long as the minor axis. This means that the ellipse 47 is relatively "flat" and elongate.

The various components are further so dimensioned and positioned that the minor axes of the ellipses 47 generally correspond to the height of the feed chamber 6, whilst the major axis corresponds to about half the width of that chamber.

The feed tines 43 are so positioned that in the lower half of their elliptical path they move adjacent and alongside the upper side of the feed platform 16 in a direction toward the bale case 4 whilst in the upper half of their path they move entirely above the top wall 19 of the feed chamber 6. This means that the feed tines 43 are fully retracted from the feed chamber 6 during the return stroke of the feed mechanism 2. The feed tines 43 adjacent the bale case 4 are also arranged to enter the bale case 4 from the right-hand side thereof through the inlet opening 7 and to retract from the bale case in a generally upward direction through an opening in the top wall thereof. To this end, the feed or inlet opening 7 and the additional opening are aligned.

Because of the offset to the left (to the right as seen in FIG. 6) of the feed tines 43 relative to the mounting pins 41, the elliptical paths 47 of the lower ends of the tines 43 are positioned further to the left in comparison with the elliptical paths defined by the pins 41. In other words, the feed tines 43 adjacent the bale case 4 penetrate further into the bale case 4 for a given position of the crank mechanism adjacent the bale case. Also, the side wall 17 of the chamber 6 may be inclined relative to the vertical as best shown in FIG. 6 so as to reduce the "dead space" in the feed chamber, that is the space not swept by the tines 43 which results in an accumulation of crop material. Furthermore, the spaced apart pairs of tines 43 are so positioned relative to each other that the respective elliptical paths 47 of the lower ends thereof either generally touch each other, or, as is shown in FIG. 6, slightly overlap each other.

The drive of the baler feed mechanism 2 is so timed with the drive of the plunger in the bale case 4 that the lead feed tines 43 (i.e. the tines 43 adjacent the bale case) enter the bale case whilst the plunger is retracted, and are withdrawn through the top opening in the bale case in sufficient time to avoid damage by the plunger on its next stroke.

When operating, as the baler moves along a windrow, the tines 14 of the pick-up 8 lift the crop material from the ground and convey it over the stripper plates 15 to deposit it on the feed platform 16. The windrow may have a width corresponding to the full width of the pick-up mechanism. The pairs of feed tines 43 sweep the crop material across the feed platform 16 towards the bale case 4 during the working stroke thereof. At the beginning of the working or feed stroke, the feed mechanism 2 assumes the position shown in broken lines in FIG. 6 with the tine supporting bar 42 extending horizontally and the feed tines 43 extending vertically downwardly therefrom. This means that the feed tines 43 enter the crop material in a generally vertical direction. The outboard feeder tines 43 move close to the outboard wall 17 of the feed chamber 6 to clear the corner thereof of any accumulated crop material. This permits the feed chamber 6 to be comparable in width to the pick-up mechanism 8 and for the pick-up mechanism to receive crop material from along its entire width without the crop material packing at the outboard end of the feed chamber which eventually would result in an accumulation of crop material along a substantial portion of length of the feed chamber, thereby rendering the baler inoperative.

At the beginning of the working stroke, the inboard tines 43 are positioned substantially midway of the feed chamber 6 or, slightly to the left thereof (to the right thereof as seen in FIG. 6). As the feed stroke commences, the feed tines 43 penetrate the crop material on the feed platform 16 whilst moving along an arcuate path which is directed downwardly and toward the bale case. During this movement the feed tines 43 remain in a substantially vertical position, whereby they have a very positive grasp on the crop material. When the feed tines 43 have fully penetrated the feeder chamber 6 and the crop material therein they travel substantially parallel to the platform 16 over a protracted path until the latter portion of the working stroke whereupon the bar 42 is lifted upwardly and the tines 43 are tracted from the crop material in an upwardly directed arcuate path. It will be appreciated that at the centre portion of the working stroke the tines 43 also follow an arcuate path (being part of the elliptical path 47) but radius of curvature is relatively large so that this portion approaches a rectilinear movement.

At the end of the feed stroke, the lead feed tines 43 enter the bale case 4 through the inlet opening 7 taking with them crop material. After the lead feed tines 43 have entered the bale case 4 the next part of their elliptical path is such that they subscribe an upward and arcuate path and force crop material into the upper lefthand corner of the bale case 4 so that the bale case is entirely filled for a properly shaped bale. The lead feed tines 43 then retract from the bale case 4 through the top opening (not shown) therein.

Simultaneously as the lead feed tines 43 are retracted from the bale case, the outboard or trailing feed tines 43 are also retracted from the crop material in an upward direction along an arcuate path. This causes the trailing tines to deposit a charge of crop material collected at the outboard half of the feed chamber 6 at a location just to the left of the centre of the chamber, and ready for engagement by the lead feed tines during the next working stroke.

Consequently the feed tines 43 are returned to the initial outboard positions by an almost rectilinear movement through the feed mechanism housing 44.

During the feed and return stroke just described, the pick-up mechanism 8 continues to deposit crop material on the feed platform 16, whereby during the subsequent feed stroke of the feed mechanism 2, the outboard feed tines 43 transport a new charge of crop material whilst the inboard or lead feed tines transport a charge of crop material previously deposited by the outboard feed tines at the receiving location of the inboard tines in the feed chamber, together with a new charge of material received directly from the inboard portion of the pick-up mechanism 8. From what precedes it will thus be clear that all crop material received in the feed chamber 6 is discharged into the bale case 4 in no more than two working strokes of the feed mechanism 2. It will also be clear that the feed mechanism 2 does not deposit crop material in any great volumes just at the inlet opening 7 of the bale case, whereby the plunger knife and the stationary shear plate do not have to cut an unduly large volume of crop material. Crop material either enters the bale case or is deposited to the right of the inlet opening 7 ready for being loaded into the bale case 4 during the next feed stroke of the feed mechanism 2. This reduces the so-called "shingling" or "saw teeth" effect as explained above. This in turn means that bales with a more regular shape are obtained and the cutting forces, and thus also the forces on the plunger and the drive, are reduced. This also means that the plunger knife and the stationary shear plate are less subject to wear and require less adjustments and any adjustments are less critical.

On a feed stroke, the crop material is pushed along in front of the feed tines 43 and draped therearound. Thus the feed tines carry a folded charge of crop material into the bale case. In the formation of the bale, many of these charges are fed to the bale case and compressed by the plunger. On compression, these charges become slices of the bale. For a properly shaped bale these slices must be uniform in density across the bale case. This depends a great deal on the way in which, and the depth that, the lead feed tines penetrate the bale case and the way they retract therefrom. However, it also depends on the size of the slices. Usually, the more slices a bale of given length comprises, the thinner the slices are and the easier it is to produce a good shaped bale. To accommodate a large number of slices, then for a given forward speed of the baler, more feed strokes, and thus plunger strokes, have to be made. Thus a high speed feed mechanism usually produces bales of regular shape even at a high operating speed and capacity. With the feed mechanism according to the invention it has become possible to increase the number of strokes per minute without creating unacceptable vibrations, etc. The feed mechanism according to the invention can be operated at 120 strokes per minute, for example, as compared with 80–100 strokes per minute of known high speed feed mechanisms. This ability to increase the working speed of the feed mechanism is due to the fact that all components of that mechanism have either a circular or other continuous path movement rather than a reciprocating movement. The inertia forces caused by the various components are, therefore, relatively small. Also, as the various components are simple in design and relatively small, they can be made much more lightweight, whereby again the inertia forces, and also the vibrations, can be kept relatively low, even though the working speed is increased.

The reduced inertia forces in turn reduce the loading, and hence the wear, of the various components. On the other hand, the increased working speed of the feed mechanism (and of the bale plunger which has to be synchronised therewith) gives rise to the baler having a capacity substantially greater than that of comparable known balers.

Furthermore, the feed mechanism according to the present invention is very simple in design and comprises a relatively small number of components. Moreover, several of these components are identical to each other, all of which reduces the cost price of the mechanism as well as the cost of maintenance and space parts. Furthermore, maintenance itself is very simple.

The height of the feed mechanism 2 and its drive is also relatively small, whereby a baler can be produced with a low profile.

The elliptical paths of the feed tines enable a feed mechanism of substantial width to be provided and yet which still employs only two pairs or sets of spaced feed fingers or tines. The elliptical paths of the two sets of tines overlap each other, whereby a feed mechanism is provided which quickly and positively clears any crop which is deposited in the feed chamber. Indeed, all crop material is cleared therefrom in no more than two strokes of the feed mechanism as already stated. The fact that a wide feed chamber and a correspondingly wide pick-up mechanism can be used whilst crop material is still quickly cleared from the pick-up mechanism is essential for the obtaining of the high capacity already referred to.

As the feed tines are oriented at all times during the working stroke in a generally vertical direction which is perpendicular to the intended direction of crop feed, the tines have a very good grasp on the crop material, whereby very positive crop feeding is obtained. This not only helps to achieve the increased capacity but also to effect complete filling of the bale case during each stroke of the bale plunger.

Finally, all the foregoing features help to avoid any substantial accumulation of crop material occurring on the feed platform and forwardly of the feed chamber so that all crop material lifted from the ground by the pick-up mechanism is fluently and smoothly conveyed towards and into the bale case.

ALTERNATIVE EMBODIMENTS OF THE INVENTION

Various alternative embodiments will now be described with reference to the FIGS. 7 to 15. Similar components of these embodiments to those of the embodiment already described bear the same reference numerals.

The inboard or lead feed tines 43 may be mounted so as to be adjustable lengthwise of the tine bar 42 or angularly relative to that bar. It has been found that a feed mechanism which performs excellently in one type of crop or crop condition does not necessarily have the same good result in another type of crop or crop condition. One factor found to be critical in this respect is the depth of penetration of the tines in the crop material and the adjustability of the tines along, or angularly of, the tine bar 42 has proved helpful to permit variation of tine penetration to suit the type or condition of crop being handled.

In the embodiment described hereinbefore, only two sets of feed tines 43 are provided. It is clear however, that more than two sets may be employed on the tine bar and that as a consequence the length of each working stroke may be shortened.

Rather than having the tine supporting bar 42 arranged horizontally and parallel to the feed platform 16, it will be clear that this bar may be arranged to assume a slightly upwardly inclined position as seen in the direction of the bale case. To this end, the crank drive mechanism adjacent the bale case may be positioned somewhat higher than the outboard drive mechanism. Nevertheless, the cranks of the spaced drive mechanisms are synchronised with the corresponding cranks of the drive mechanisms at all times being positioned parallel to each other.

Also, whilst in the embodiment of FIGS. 1 to 6 the major axes of the elliptical paths 47 are positioned generally horizontal, it is possible, and may even be desirable, to arrange the various components such that these major axes are inclined relative to the horizontal. The arrangement may be such that the major axes of the ellipses described by the feed tines are inclined upwardly towards the bale case. Thereby the lead feed tines will retract more readily from the bale case on completion of the feed stroke and yet the tine bar may extend horizontally during the entire operating cycle.

In the embodiment shown in FIGS. 2 to 6, the gears 36 are positioned as close as possible to the stationary gears 27. This means that the intermediate and reversing gears 35 have their axes of rotation 37 not on the line interconnecting the axes 29 and 38. Instead thereof the axes 29, 37 and 38 define a triangle, whereby the crank 31 also basically has a triangular shape. In an alternative arrangement the gears 27, 35 and 36 may have their centres on a straight line, whereby the crank 31 may have an elongate, parallel-sided shape.

Figure 7:
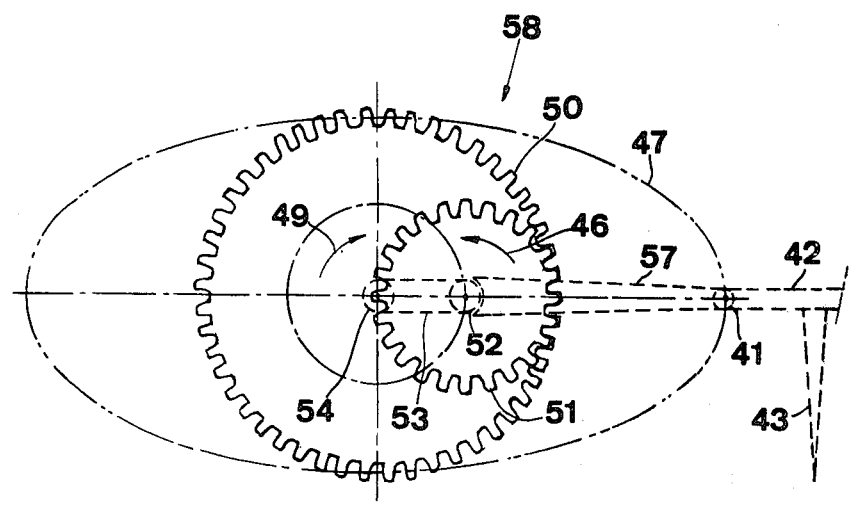
FIG. 7 is a view similar to FIG. 5 but illustrating another embodiment of the invention.
Figure 9:
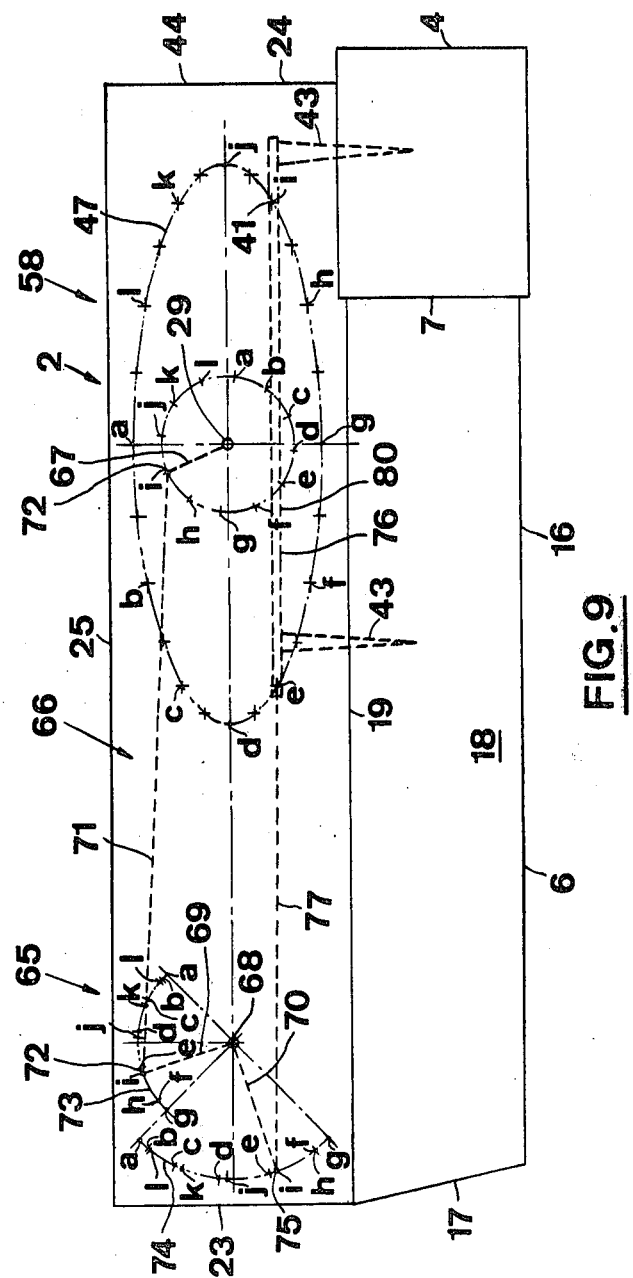
FIG. 9 is a view similar to FIG. 6 but illustrating yet another embodiment of the invention.

Also in the embodiment of FIGS. 2 to 6, the gears 27, 35 and 36 of the drive mechanism 58 all are external gears but these three gears may be replaced by only a pair of gears of which one is a stationary internal gear. This alternative arrangement of the drive mechanism 58 is schematically shown in FIG. 7. The stationary internal gear is indicated at 50 and the other movable gear at 51. The external gear 51 has only half as many teeth as the internal gear 50 and is rotatably mounted on a shaft 52 which is part of the first crank mechanism 53 (comparable to the first crank 31 in FIGS. 2-6) which is rotatably mounted coaxially with the stationary gear 50 at 54. The first crank mechanism 53 is caused to rotate in clockwise direction 49 around the axis 54 as seen in FIG. 7. This causes the gear 51 to roll over the internal gear teeth of the stationary gear 50 and to rotate in an anti-clockwise direction 46 around its own axis 52. An arm or second crank 57 (comparable to the second crank 40 of the arrangement according to FIGS. 2-6) is rigidly coupled to the second gear 51 and is thus caused to rotate in unison with the gear 51. This second crank 57 is approximately twice as long as the first crank 53. The mounting pin 41 on the other end of the crank 57 is caused to move along an elliptical path 47 similar to the paths followed by the pins 41 of the first embodiment. Similarly as in the first embodiment, two such drive arrangements are provided which are synchronized with each other and which support between their mounting pins 41 a single feed time supporting bar 42, the feed tines 43 mounted thereon thus also describing elliptical paths.

The drive transmission comprising the shaft 33 and the pinions 30–32 may be modified. In one alternative arrangement, this transmission is replaced by a pair of sprockets which are secured on the respective crank shafts 29 with a drive chain extending therearound. One of the crank shafts 29, preferably the inboard one, also supports a further sprocket for receiving motive power from another drive shaft in the baler, and which extends parallel to the crank shafts 29, via a further chain transmission.

Figure 8:
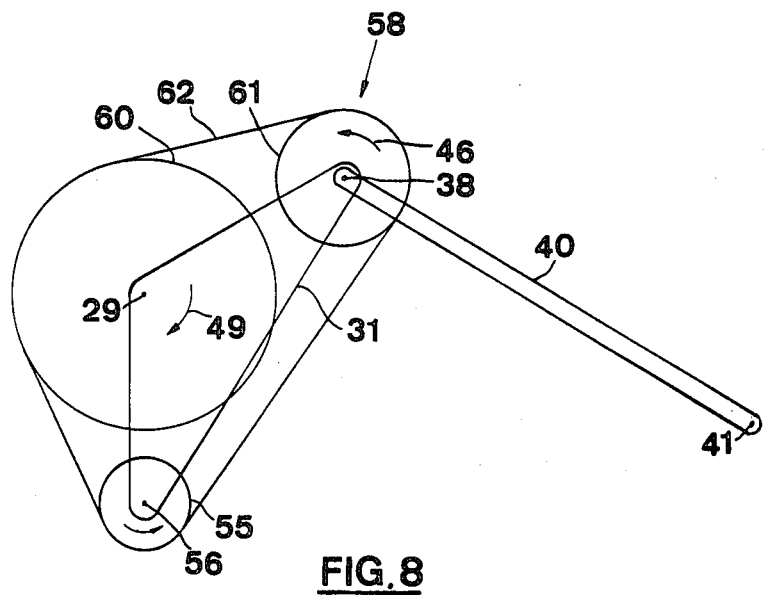
FIG. 8 is a view similar to FIG. 7 but illustrating a further embodiment of the invention.

In another embodiment shown in FIG. 8, the gears 27, 35 and 36 are replaced by a chain drive mechanism. More particularly, the stationary gear 27 is replaced by a stationary sprocket 60, and the gears 35 and 36 replaced by a sprocket 61 rotatably mounted on the crank mechanism 31 at a short distance from the stationary sprocket 60. The stationary sprocket 60 has twice as many teeth as the movable sprocket 61. A chain 62 extends around both sprockets as well as around an idler sprocket 55 which is rotatably mounted on the crank 31 via a spindle 56. The spindle 56 is adjustably mounted on the crank mechanism 31 at the side of the stationary sprocket 60 opposite to the movable sprocket 61 to take up any slack in the chain. The sprocket 61 rigidly supports the further crank 40 with the mounting pin 41. Again, the crank 40 is about twice as long as the distance between the shafts 29 and 38. As the crank 31 with the sprocket 61 is rotated in the clockwise direction 49 (as seen in FIG. 8) around the axis 29, the chain 62 is driven likewise causing the further sprocket 61 to rotate in an anti-clockwise direction 46 (as seen in FIG. 8) around its own shaft 38 on the crank 31. This again causes the mounting pin 41 at the extreme end of the crank 40 to follow an elliptical path. Similarly as in the above described embodiments, a pair of such drive means 58 is provided which are transversely spaced apart and which are coupled to each other by a tine supporting bar extending between the mounting pins 41 of the respective drive means.

In the preferred embodiment, as well as in the alternatives described above, a pair of spaced apart drive mechanisms 58 is provided which both receive motive power from a main input drive mechanism such as a drive shaft 33. Thus, both mechanisms 58 are positively driven in synchronism. It is possible however to conceive alternative arrangements wherein only one drive mechanism 58 is employed. The tine supporting bar 42 is mounted at one end on said drive mechanism and is coupled at its other end to another mechanism 65 which is driven by the drive mechanism 58 via a suitable drive transmission 66. Four different arrangements of this type are shown in FIGS. 9 to 15.

Figure 10:
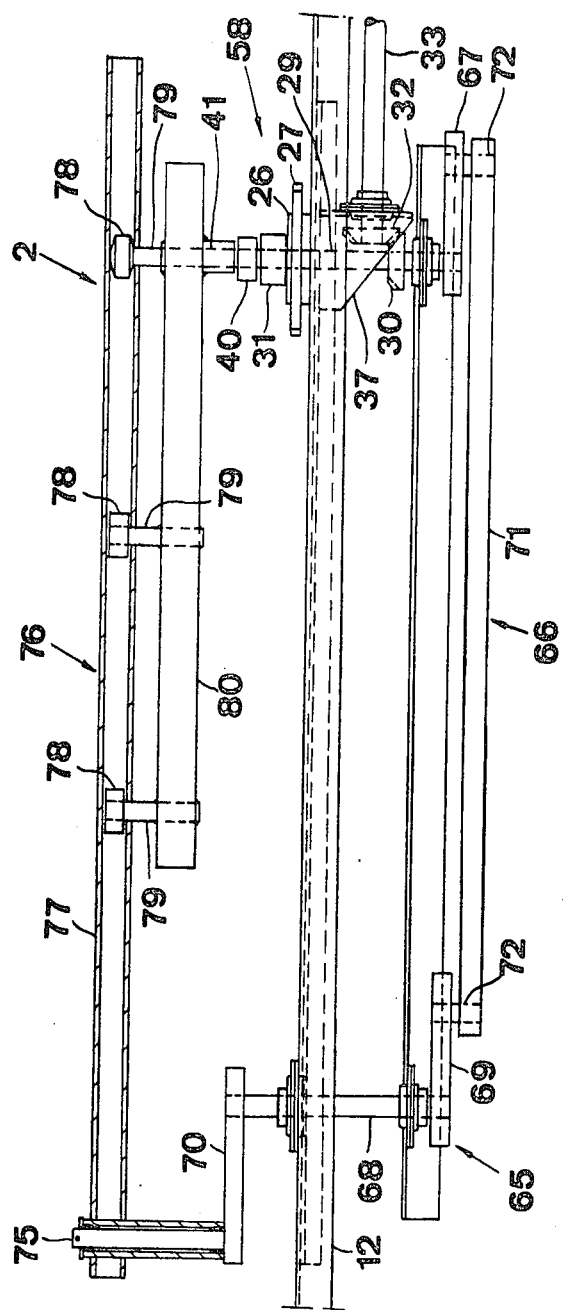
FIGS. 10 and 11 are views similar to FIGS. 2 and 3 but illustrating the embodiment of FIG. 9.
Figure 11:
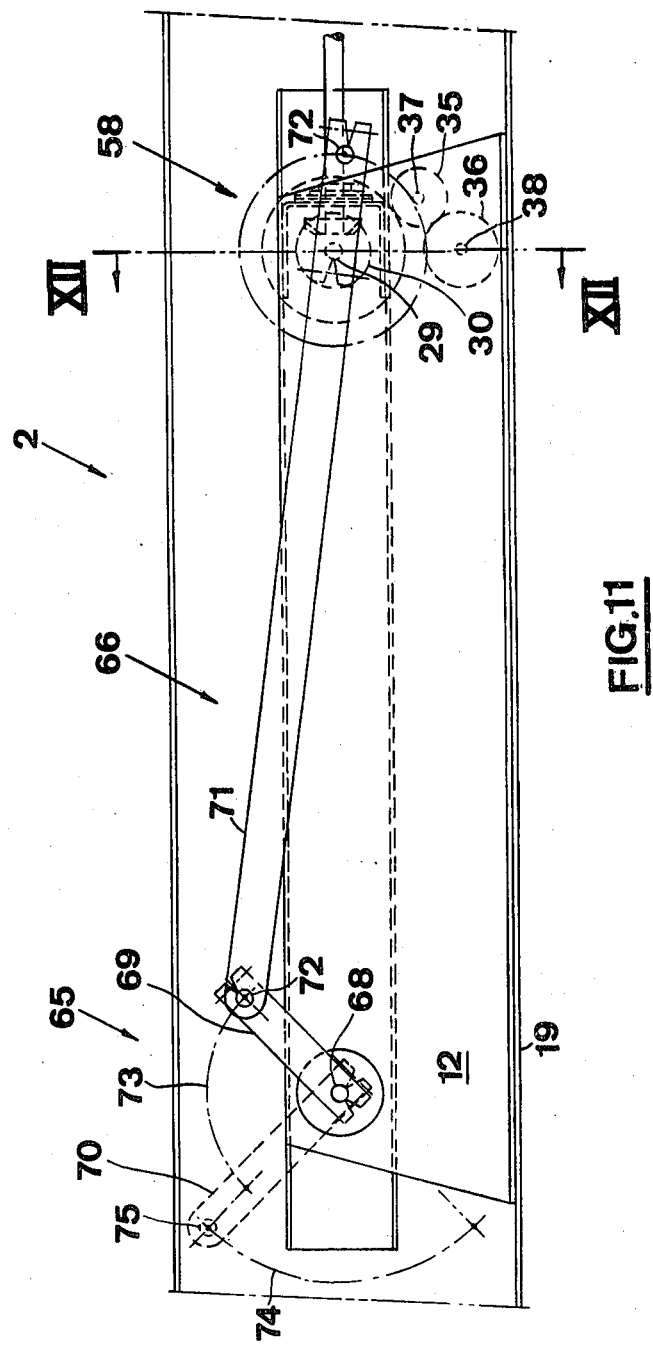
Figure 12:
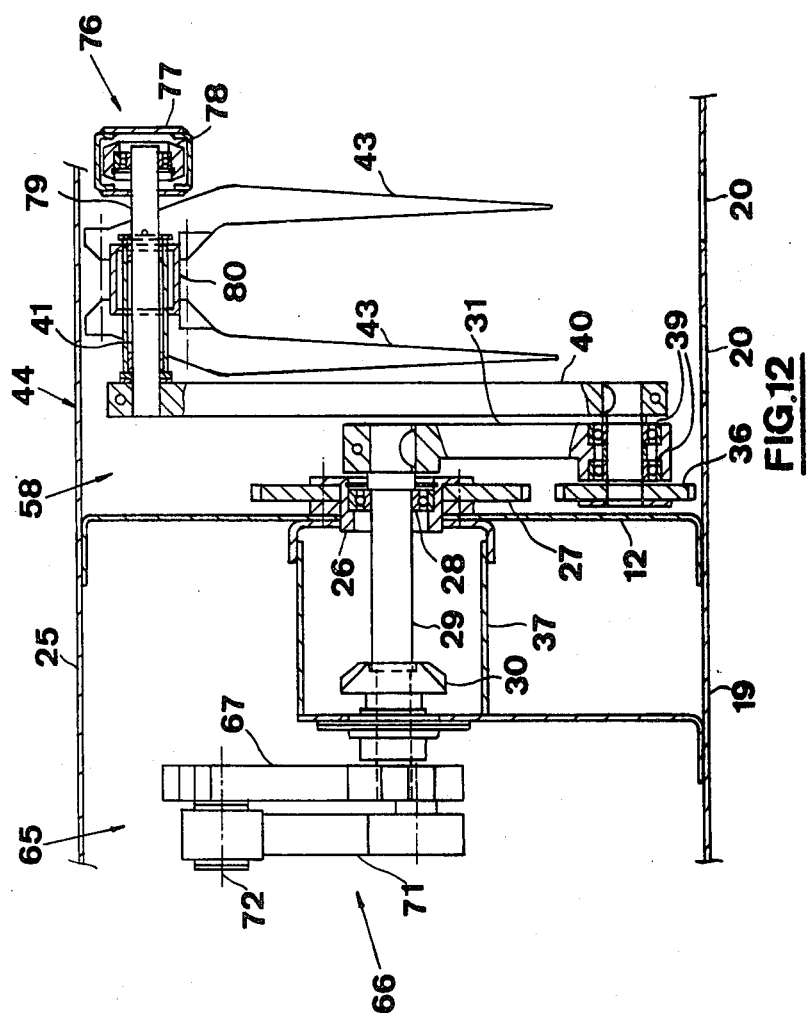
FIG. 12 is a sectional view taken along the line XII—XII of FIG. 11, but with the components in another position.

FIGS. 9 to 12 show a first one of these arrangements in which the single drive mechanism 58 is provided on the inboard side of the feed mechanism 2 and may be of any of the types described hereabove. The drive mechanism 58 shown in FIGS. 10 to 12 is similar to the one shown in FIGS. 2 to 6. However, for the sake of clarity and simplicity, the drive mechanism 58 is not shown in any detail in FIG. 9, merely the elliptical path 47 of the mounting pin 41.

The input shaft 33 for the feed mechanism 2 is shortened and extends only to about the inboard end of the feed mechanism. A single pinion 32 on the input shaft 33 meshes with the further pinion 30 on the crank shaft 29 which supports a first crank 31, in a manner already described, at the rear of the wall 12. At its other end, the crank shaft 29 supports a further crank 67. At the location of the outboard crankshaft 29 of the arrangement according to FIGS. 2 to 6, another crank shaft 68 is provided in this embodiment supporting at its opposite ends cranks 69 and 70. The cranks 67 and 69 are connected to each other via a connecting rod 71 pivotably mounted on respective mounting pins 72 on the cranks 67 and 69 in a manner such that rotation of the crank 67 causes oscillation of the crank 69 in an arcuate path 73 extending generally transversely of the feed mechanism 2. The cranks 69 and 70 are provided at an angle with respect to each other to an extent such that oscillatory movement of the crank 69 in a transverse direction results in an oscillatory up-and-down movement of the crank 70 along the path 74. The path 74 is positioned close to the outboard side wall 23 of the feed mechanism housing 44.

It will be appreciated that it is no longer possible in this embodiment to provide a simple rigid tine bar 42 between the mounting pin 41 on the crank 40 and a further mounting pin 75 on the crank 70. This is because the mounting pin 41 moves along an elliptical path 47 whilst the other mounting pin 75 moves along an arcuate path 74 in a generally up-and-downward direction. To overcome this, a telescopic tine bar 76 is provided between the mounting pins 41 and 75. The telescopic tine bar 76 comprises an elongate guide member 77 of generally rectangular section and having an elongate aperture therein on one of its sides. The guide member 77 is pivotally mounted at one end on the mounting pin 75 and is adapted to receive at its inner side three spaced rollers 78 which are mounted on spindles 79 projecting through the elongate opening in the guide member 77. The spindles 79 are attached to a tine supporting bar 80 which at one end is also pivotally mounted on the mounting pin 41 on the crank 40. Feed tines 43 are mounted in a depending fashion on the tine supporting bar 80.

In operation, the tine supporting bar 80 is moved at its end mounted on the mounting pin 41 along an elliptical path 47 but the guide member 77 is caused to move in an up and down direction along an arcuate path at its pivotal connection with the mounting pin 75. As a result, the member 77 and the bar 80 telescope relative to each other with the guide member 77 having a basically oscillatory movement and the bar 80 having a basically elliptical movement. Thus the feed tines 43 on the tine bar 80 move along a basically elliptical path. The paths of the pins 41 and the cranks 67, 69 and 70 have been divided into points a to l in FIG. 9 to indicate movement along one path relative to the others.

Figure 13:
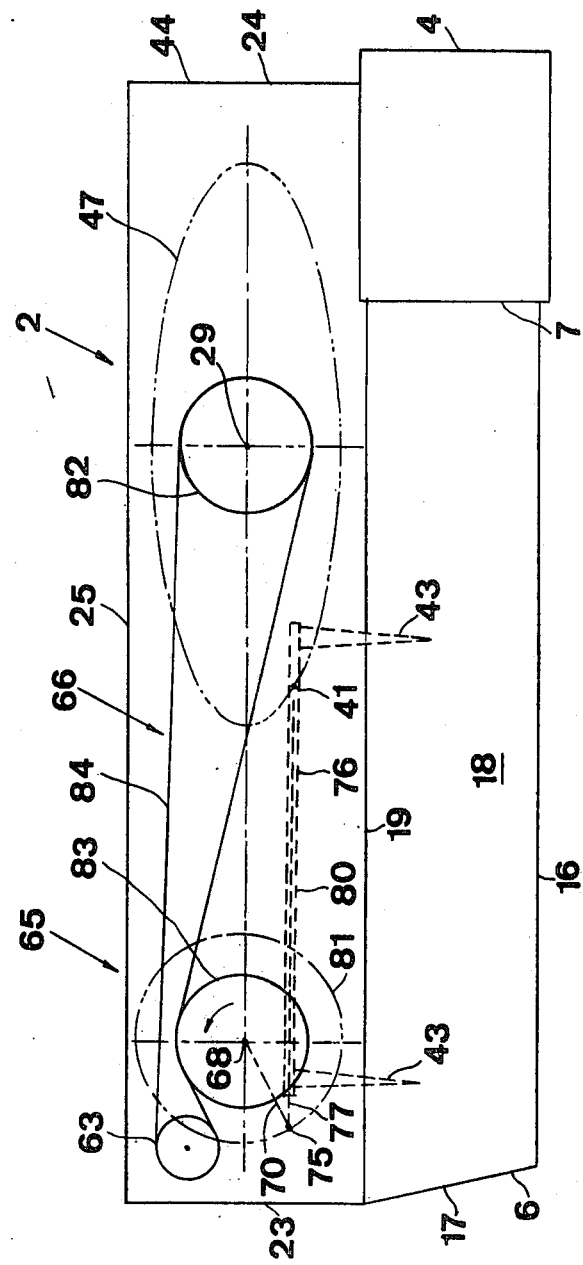
FIGS. 13, 14 and 15 are views similar to FIG. 9 but illustrating respectively three further embodiments of the invention.

In the embodiment shown in FIGS. 9 to 12 the outboard end of the feed mechanism 2 is caused to oscillate along an arcuate path 74 in an up-and-down direction. The drive transmission 66 may, however, also be arranged so that the outboard end is caused to move along a circular path 81. Such an arrangement is shown in FIG. 13 wherein the drive means 66 comprise a chain and sprocket transmission with a first sprocket 82 on the shaft 29, a second sprocket 83 on the shaft 68 and an idler sprocket 63 on the wall 12. A chain 84 passes around the sprockets 82 and 63 and is in driving engagement with the sprocket 83 so that the crank shafts 29 and 68 are rotated in opposite directions. Apart from the foregoing, the remainder of this alternative embodiment may be identical to the embodiment shown in the FIGS. 9 to 12. Thus, a telescopic tine bar 76 is provided between the respective mounting pins 41 and 75 on the cranks 40 and 70 whereby the feed tines 43 again follow a generally elliptical path during operation.

Figure 2:
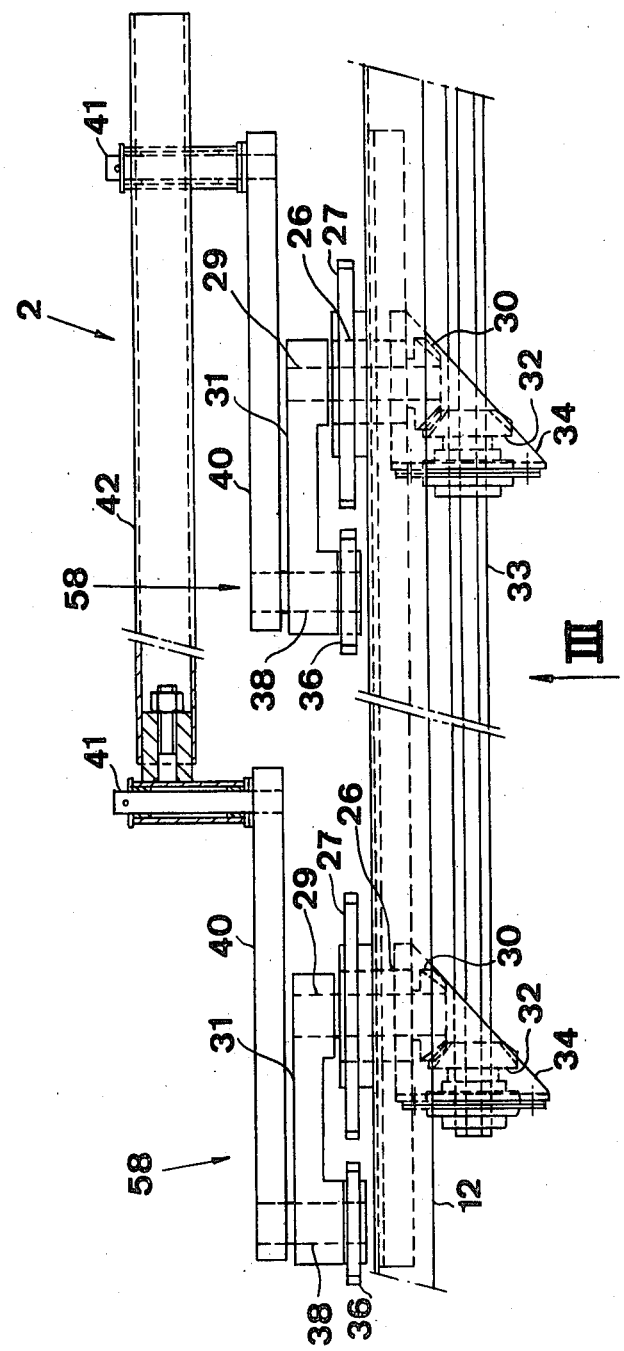
FIG. 2 is a partial sectional view on a different scale taken along the line II—II of FIG. 1.
Figure 4:
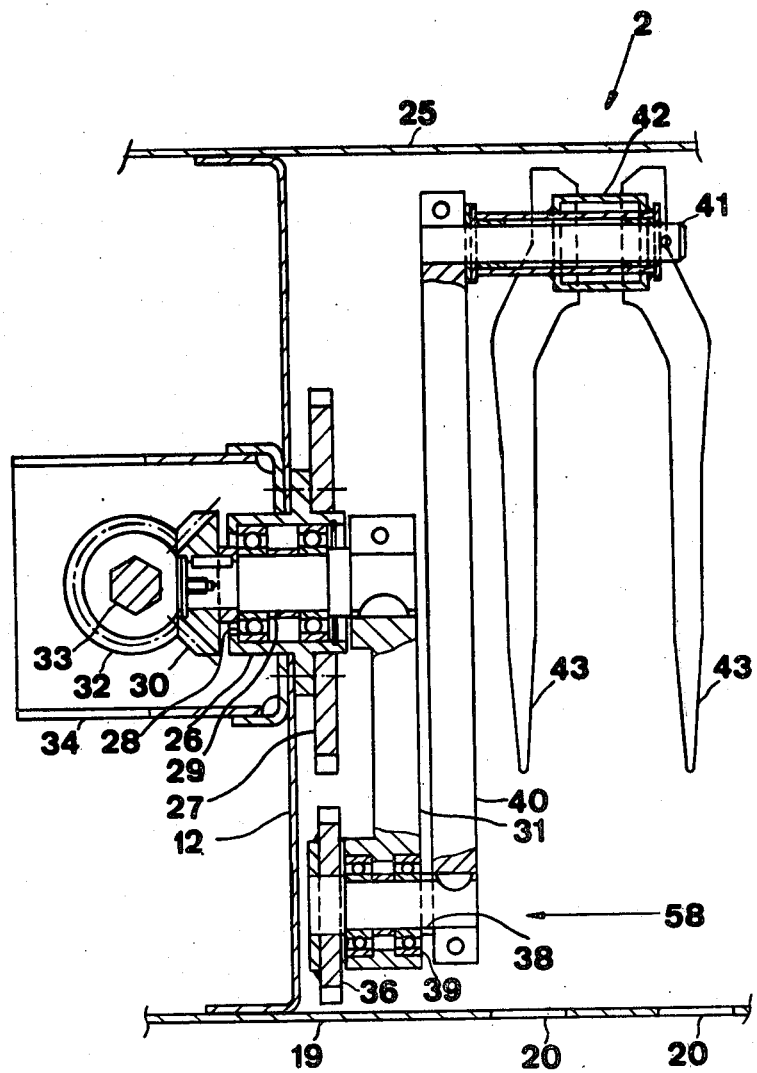
FIG. 4 is a sectional view taken along the line IV—IV in FIG. 3 with components in a different position.

The drive transmission means 66 of the FIG. 13 embodiment comprising the chain 84 and the sprockets 63, 82 and 83 may be replaced by a drive transmission similar to the drive transmission shown in FIGS. 2 to 4, the only difference being the fact that the opposed pairs of pinions 30 and 32 should be arranged to rotate the respective shafts 29 and 68 with which they are associated in opposite directions.

Figure 14:
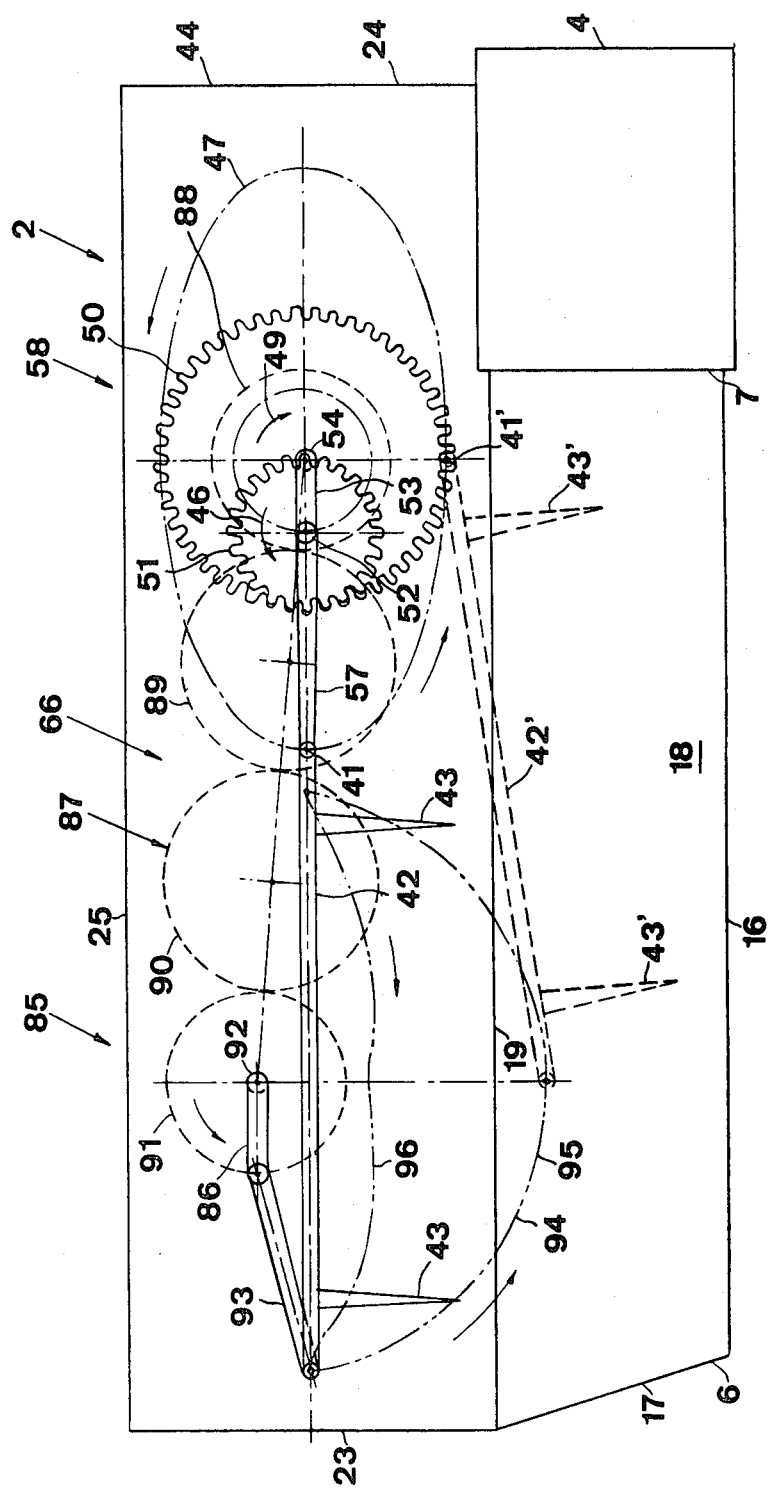

FIG. 14 illustrates another embodiment wherein one drive mechanism 58 is applied in combination with a further mechanism 85. The drive mechanism 58 shown is of the type comprising a stationary internal gear 50 and a movable external gear 51 and is identical to the structure shown in FIG. 7 of the first embodiment. The further mechanism 85 comprises a crank 86 which is driven in synchronism with, though in an opposite direction, to the crank 53. To this end a gear train 87 is provided comprising gears 88, 89, 90 and 91. The gears 88 and 91 are keyed on the crank shafts 54 and 92, respectively, the latter supporting the crank 86. The crank 86 is coupled at its other end to one end of a connecting rod 93. The connecting rod 93 is pivotally coupled at its other end to the tine supporting bar 42. The tine supporting bar 42 is of a simple, non-telescopic design, similar to the one shown in FIGS. 2 to 6. The tine bar 42 is pivotally coupled at its other end to the mounting pin 41 of the crank 57, whereby this end is moved along an elliptical path 47 during operation. The end of the bar 42 which is coupled to the connecting rod 93 is caused to move along a path 94 which is irregular in shape and which basically comprises an elongated arcuate section 95 which corresponds with the working stroke of the tine bar 42 and a section 96 of irregular shape at a much higher position and which corresponds to the return stroke of the feed mechanism 2.

Figure 15:
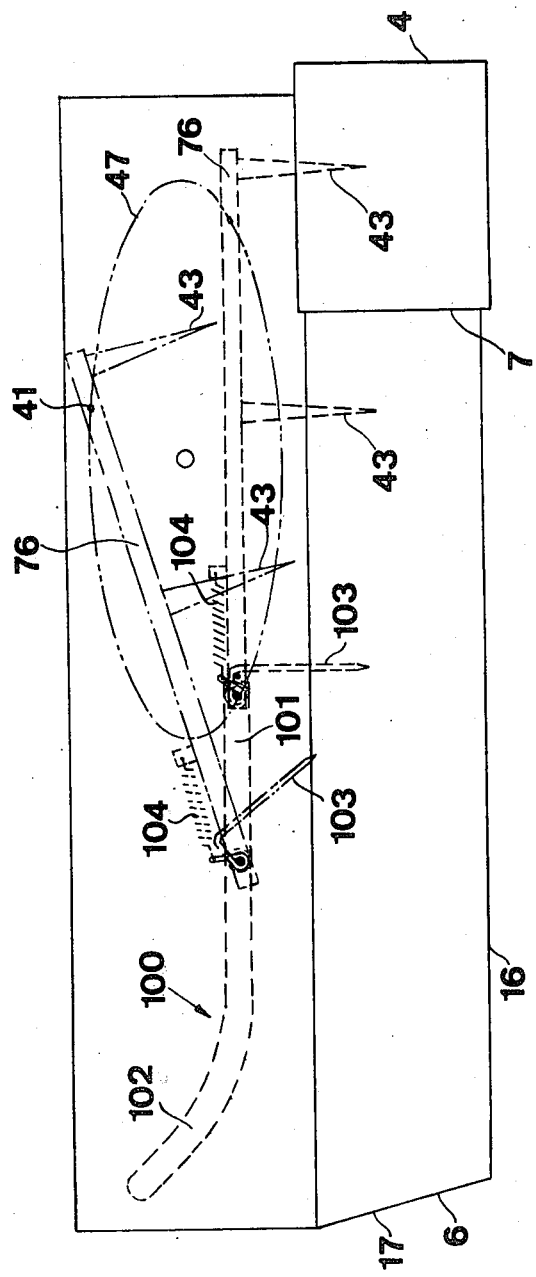

FIG. 15 illustrates a further embodiment which is similar to that of FIGS. 9 to 12. The outboard end of the tine bar 76 is guided for movement in a pair of opposed guide channels 100, the tine bar being provided with rollers which engage the respective channels. Each guide channel 100 comprises a straight inner section 101 extending closely above the feed chamber 6 and an upturned outer section 102. The tine bar 76 is provided not only with the fixed tines 43 as in the other described embodiments but also with one pair of pivotable tines 103 mounted towards the outboard end of the tine bar. The tines 103 are urged to a position in which they depend from the tine bar 76 in a generally vertical direction by tension springs 104. In operation, the inboard end of the tine bar 76 moves around the elliptical path 47 whilst the outboard end moves along the curved guide channels 100. During the working stroke of the tine bar 76, the pivotable tines 103 remain in position of the right-hand pair as shown in FIG. 15 but on the return stroke, the tines 103 flip up against the action of the springs 104 to the position illustrated by the left-hand pair of tines as seen in FIG. 15. The tines 103 are moved against the action of the springs 104 by the crop material which has entered the feed chamber 6 during the working stroke of the tine bar 76.

It is possible, in an arrangement similar to the one shown in FIG. 2, to transmit motive power from one drive means 58 to the other drive means 58 via the tine supporting bar 42. In such an alternative arrangement, the shaft and bevel gear transmission 30-32-33 between the spaced apart drive means 58 are omitted. However, without taking precautions, problems would be encountered when operating this alternative when the drive means 58 and the tine supporting bar 42 reach their respective "dead centre" positions. To overcome this, a drive aid may be provided in the form of a crank and connecting rod transmission. Such a transmission may be similar to the one shown in FIG. 10 comprising the cranks 67 and 69 and the connecting rod 71. In this case the cranks 67 and 67 should be positioned at an angle of 90° relative to the first cranks 31 of the drive means 58 whereby, when the drive means 58 and the tine bar 42 reach their "dead centre" positions, the crank and connection rod transmission help the drive means 58 and the tine supporting bar beyond their "dead centre" positions.

All feed mechanisms 2 described above thus comprise epicyclic drive means which in operation cause at least one end of the feed tine bar to follow a particular epicyclic path, namely an elliptical path. These feed mechanisms all evenly distribute the crop material in the bale case 4 and properly fill the upper outer corner of the bale case remote from the feed chamber 6. Also, the baler can operate at higher speed enabling thinner slices of crop material to be fed to the bale case for greater uniformity in bale shape and density resulting in better bale stability. The increased rate of the feed mechanism also permits faster movement of the baler for a higher capacity.

What we claim is:

1. A baler having a drive shaft and a plurality of housing walls adjacent a feed mechanism comprising:
   a feed bar carrying a plurality of tines; and
   means for driving the feed bar in an elliptical path, said means including a first shaft having a first crank connected at one end thereof, said first crank rotatably supporting first and second gears, said first gear being a reversing gear intermeshing with a stationary gear and said second gear, said stationary gear supported by one of said walls, a second shaft supporting said second gear at one end thereof and a second crank at another end thereof, said second crank connected to said feed bar.

2. The mechanism of claim 1 including:
   a pinion connected to said first shaft, said pinion operably connected to a drive shaft.

3. The mechanism of claim 1 wherein said first gear is rotatably mounted on a stub shaft connected to said first crank.

4. The mechanism of claim 1 wherein said first crank is of a triangular configuration.

5. The mechanism of claim 4 wherein said first, second and stationary gears have their respective axes connected at the three inherent corners of said triangular first crank.

6. The mechanism of claim 1 wherein said second crank has a length approximately twice the length of said first crank.

7. A baler having a drive shaft and a plurality of housing walls adjacent a feed mechanism comprising:
   a feed bar carrying a plurality of tines; and
   means for driving the feed bar in an elliptical path, said means including a stationary gear and a first shaft, said stationary gear and first shaft supported by one of said walls and having respective centroidal axes aligned, a first crank rotatably mounted on said first shaft, first and second gears, said first gear being mounted on said first crank for rotating in meshed engagement with said stationary gear, said second gear being mounted on said first crank for rotating in meshed engagement with said first gear, a second shaft and a second crank, said second shaft rotatably supporting said second gear and one end of said second crank, another end of said second crank rotatably connected to said feed bar.

8. In combination with a baler having a drive shaft and a plurality of housing walls adjacent a feed mechanism;
   a feed bar carrying a plurality of tines; and
   means for driving said feed bar in an elliptical path, said means including a first shaft extending from said drive shaft through one of said walls, a stationary gear supported by said one wall, said stationary gear and said first shaft having aligned centroidal axes, said first crank rotatably mounted on said first shaft, first and second gears, said first gear being mounted on said first crank for rotating in meshed engagement with said stationary gear, said second gear being mounted on said first crank for rotating in meshed engagement with said first gear, a second shaft and a second crank, said second shaft rotatably supporting said second gear and one end of said second crank, another end of said second crank rotatably connected to said feed bar.

* * * * *